W. Q. GLASS.
GARDEN HOSE SUPPORT.
APPLICATION FILED OCT. 7, 1913.
1,118,197.
Patented Nov. 24, 1914.
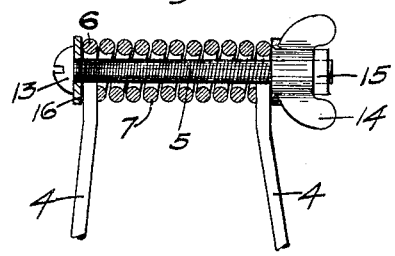
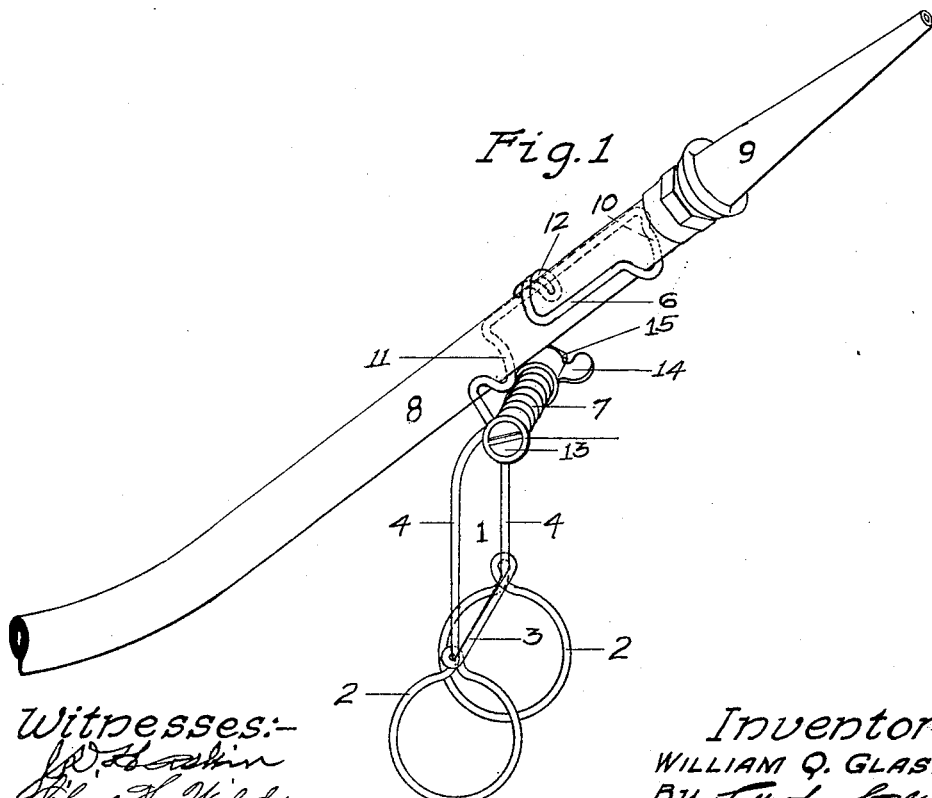
Witnesses:-
Inventor:-
WILLIAM Q. GLASS,
By
His Attorney.

UNITED STATES PATENT OFFICE.

WILLIAM Q. GLASS, OF LONG BEACH, CALIFORNIA.

GARDEN-HOSE SUPPORT.

1,118,197.  Specification of Letters Patent.  Patented Nov. 24, 1914.

Application filed October 7, 1913. Serial No. 793,856.

*To all whom it may concern:*

Be it known that I, WILLIAM Q. GLASS, a citizen of the United States, residing at Long Beach, in the county of Los Angeles and State of California, have invented a new and useful Garden-Hose Support, of which the following is a specification.

My invention relates to improvements in garden hose supports, and the object of my invention is to provide a simple, cheap and effective adjustable stand for supporting the nozzle of a hose for sprinkling purposes for regulating the angle of the spray.

Other objects may appear in the subjoined detailed description and specification.

I attain this object by means of the mechanism illustrated in the accompanying drawings, in which—

Figure 1 is a perspective view of the support with a hose in position for sprinkling thereon. Fig. 2 is a section through the center of the adjusting spring and bolt.

The stand consists of the main supporting member 1 having the looped lower ends 2, the connecting links 3 and the upwardly extending arms 4 which loop over and are hingedly mounted upon the adjusting bolt 5 at the top, and this member 1 may be made of wire formed as shown in Fig. 1 or of any other suitable material which will permit of a slight resiliency in the arms 4.

The arms are spaced apart at the top and between them is hingedly and resiliently mounted upon the bolt 5 the hose bracket 6 whose hinged end is formed into a spring at 7, each end of which spring engages one of the arms 4 and the outer portion of the bracket is peculiarly formed as shown in Fig. 1 so as to resiliently engage and hold a hose 8 or a nozzle 9, the inner and outer portions 10 and 11 being bent to conform to the shape of and receive the hose 8 and the extreme end of the bracket being bent back toward the hinge bolt 5 and formed to engage the top of the hose and hold it tightly in position in the bracket as at 12. The adjusting bolt 5 has the head 13 on the outside of one of the arms 4, passes through the loops in the ends of these arms and through the spring 7, and has threaded on its other end the wing nut 14 and the lock nut 15, the wing nut being for purpose of adjusting the tension of the spring 7 and the nut 15 for holding it when so adjusted.

As shown in Fig. 1, when the hose 8 is placed in the bracket 6 and the nuts 14 and 15 tightened, the hose will serve as another leg for the stand and being on the opposite side from the main stand 1 will support the hose and nozzle in any position and at any angle it may be set, and the direction and angle of the spray regulated, as desired. Suitable washers may be interposed between the arms 4 and the head of the bolt 13 or between the arms and the nut 14, as at 16, and the form of the stand or bracket may be changed to suit convenience without departing from the spirit or intent of my invention, the novelty and invention of my device residing in and involving the single stand and the resiliently hinged supporting bracket connected therewith, and I desire to claim broadly thereon.

Having thus described my invention, what I claim as my invention and desire Letters Patent for, is:

1. In a device of the character described, the combination, of a main supporting stand having upwardly extending resilient arms, an adjusting bolt in the upper ends of said arms, a bracket for holding said hose having one end formed into said compression spring adapted to pivot on said bolt and compress between said arms, the extremes of its outer portion being adapted to engage the lower portion of said hose and its intermediate portion forming the end thereof adapted to engage the upper portion of said hose for holding it resiliently but firmly in position in said bracket, an adjusting nut on the outer end of said bolt, and a lock nut on said bolt adjacent to said adjusting nut.

2. In a device of the character described, the combination of a supporting stand having a pair of opposite legs, formed into loops and rigidly braced at the bottoms, upwardly extending and having smaller loops at the upper ends; a bolt secured in said upper loops; a bracket having one end formed into a spring, positioned on said bolt between said upper loops and adapted to compress therebetween, the extremes of said bracket being bent downwardly to engage the lower side and the central portion thereof being bent upwardly to engage the upper side of a hose for holding said hose in a desired position on said stand.

3. In a device of the character described, the combination of a supporting stand having a pair of opposite legs with rigidly braced loops at the lower ends, upwardly extending, and with smaller loops at the upper ends; a bolt secured in said upper loops; a bracket having one end formed into a coil spring adapted to be resiliently and pivotally positioned on said bolt and to compress between said upper loops, the extremes of the major portion of said bracket being bent to receive and engage the lower side of a hose, and the central portion thereof being similarly bent to engage the upper side of said hose; and a nut on one end of said bolt for locking said bracket in position on said stand for holding said hose at any desired angle.

4. In a device of the character described, the combination of a main supporting stand formed out of a single piece of wire and having two opposite and upwardly projecting resilient arms rigidly braced at the bottom; a bolt secured in the upper ends of said arms; a bracket pivoted on said bolt having one end formed into a spring adapted to be positioned on said bolt and to compress between said arms, the outer portion of said bracket being formed into two downwardly bent end portions and a single central upwardly bent portion for holding a hose in position in the bracket; and means for locking said bracket for holding said hose at any desired angle.

WILLIAM Q. GLASS.

Witnesses:
 ANNE HARTENSTERN,
 J. D. HASKIN.

Copies of this patent may be obtained for five cents each, by addressing the "Commissioner of Patents, Washington, D. C."